US009031991B2

(12) United States Patent
Lewis et al.

(10) Patent No.: US 9,031,991 B2
(45) Date of Patent: May 12, 2015

(54) WEB SERVICE INTERFACE FOR ORDER MANAGEMENT SYSTEM

(75) Inventors: Mark David Lewis, Parker, CO (US); Ying Wang, San Mateo, CA (US); Re Lai, Fremont, CA (US)

(73) Assignee: Oracle International Corporation, Redwood Shore, CA (US)

( * ) Notice: Subject to any disclaimer, the term of this patent is extended or adjusted under 35 U.S.C. 154(b) by 863 days.

(21) Appl. No.: 12/254,764

(22) Filed: Oct. 20, 2008

(65) Prior Publication Data

US 2009/0106287 A1   Apr. 23, 2009

Related U.S. Application Data

(60) Provisional application No. 60/981,446, filed on Oct. 19, 2007.

(51) Int. Cl.
  *G06F 17/30* (2006.01)
  *G06F 7/00* (2006.01)
  *G06Q 30/06* (2012.01)

(52) U.S. Cl.
  CPC ............ *G06Q 30/06* (2013.01); *G06Q 30/0601* (2013.01)

(58) Field of Classification Search
  USPC .................. 707/602, 758, 792, 793, 797, 809
  See application file for complete search history.

(56) References Cited

U.S. PATENT DOCUMENTS

| 5,717,866 | A | 2/1998 | Naftzger ..................... 705/14.38 |
| 5,774,670 | A | 6/1998 | Montulli ....................... 709/227 |
| 5,926,525 | A | 7/1999 | Kim ........................... 379/88.33 |
| 5,968,110 | A | 10/1999 | Westrope et al. ............... 705/27 |
| 6,917,922 | B1 | 7/2005 | Bezos et al. ................. 705/26.81 |
| 6,985,905 | B2 * | 1/2006 | Prompt et al. ................. 707/829 |
| 7,003,722 | B2 * | 2/2006 | Rothchiller et al. ........... 715/212 |
| 2001/0011241 | A1 | 8/2001 | Nemzow ......................... 705/35 |
| 2001/0014103 | A1 | 8/2001 | Burns et al. .................... 370/429 |
| 2002/0107761 | A1 | 8/2002 | Kark et al. ........................ 705/27 |
| 2002/0133510 | A1 * | 9/2002 | Lau ................................ 707/203 |
| 2003/0004895 | A1 | 1/2003 | Nuttall et al. |
| 2003/0023963 | A1 | 1/2003 | Birkholz et al. .............. 717/172 |
| 2003/0088573 | A1 | 5/2003 | Stickler ......................... 707/100 |
| 2004/0006516 | A1 | 1/2004 | Anagol-Subbarao ........... 705/26 |

(Continued)

OTHER PUBLICATIONS

Commercenet, Federal Agencies, Technology Vendors, and Suppliers Demonstrate New Technologies for Tying Together Independent, Proprietary Catalogs, Mar. 15, 2000, PR Newswire; http://search.proquest.com/printviewfile?accountid=14753; pp. 2-5.

(Continued)

*Primary Examiner* — Sangwoo Ahn
(74) *Attorney, Agent, or Firm* — Campbell Stephenson LLP

(57) ABSTRACT

Various techniques for providing a Web Service interface to an order management system are disclosed. In one embodiment, a Web Service interface receives a hierarchical property set, which includes properties being input to an order management system. The Web Service interface accesses mapping information, which associates a variable in a flat property set with a hierarchical property set path. The Web Service interface uses the mapping information to convert the hierarchical property set to the flat property set, based upon the mapping information, and then causes the order management system to process the flat property set. The Web Service interface can also use the same mapping information to convert a flat property set generated by the order management system into a hierarchical property set.

22 Claims, 5 Drawing Sheets

(56) References Cited

U.S. PATENT DOCUMENTS

| | | | |
|---|---|---|---|
| 2004/0015443 A1 | 1/2004 | McCoy | 705/50 |
| 2004/0054603 A1 | 3/2004 | Clinesmith et al. | 705/26 |
| 2004/0064351 A1 | 4/2004 | Mikurak | 705/7 |
| 2004/0133656 A1 | 7/2004 | Butterworth et al. | 709/219 |
| 2005/0044197 A1 | 2/2005 | Lai | 709/223 |
| 2005/0114270 A1 | 5/2005 | Hind et al. | 705/64 |
| 2005/0131759 A1 | 6/2005 | Agrawal et al. | 705/14 |
| 2005/0149547 A1 | 7/2005 | Wight et al. | 707/101 |
| 2005/0198394 A1* | 9/2005 | Waldorf et al. | 709/246 |
| 2006/0011720 A1 | 1/2006 | Call | 235/383 |
| 2006/0122942 A1 | 6/2006 | Nuttall et al. | |
| 2006/0136593 A1 | 6/2006 | Silky et al. | |
| 2006/0143079 A1 | 6/2006 | Basak et al. | 705/14 |
| 2006/0167988 A1 | 7/2006 | Barck et al. | 709/203 |
| 2006/0168226 A1 | 7/2006 | Miller et al. | 709/226 |
| 2006/0205420 A1* | 9/2006 | Bibr et al. | 455/466 |
| 2007/0083459 A1 | 4/2007 | Eubanks | 705/38 |
| 2007/0150370 A1 | 6/2007 | Staib et al. | 705/26 |
| 2008/0133303 A1 | 6/2008 | Singh et al. | |
| 2009/0106128 A1 | 4/2009 | Varmaraja et al. | 705/26.1 |
| 2009/0106129 A1 | 4/2009 | Varmaraja et al. | 705/26.1 |
| 2009/0106398 A1 | 4/2009 | Seaman et al. | 709/219 |
| 2009/0106402 A1 | 4/2009 | Varmaraja et al. | 709/220 |
| 2010/0094716 A1 | 4/2010 | Ganesan et al. | 705/26 |

OTHER PUBLICATIONS

Zimmermann, Olaf et al., "Service-Oriented Architecture and Business Process Choreography in an Order Management Scenario: Rationale, Concepts, Lessons Learned," OOPSLA '05, Oct. 16-20, 2005, San Diego, CA, pp. 12.

* cited by examiner

WEB SERVICE INTERFACE FOR ORDER MANAGEMENT SYSTEM

RELATED APPLICATIONS

This application claims the benefit, under 35 U.S.C. §119(e), of U.S. Provisional Application No. 60/981,446, filed Oct. 19, 2007, entitled "Web Service Architecture for Order Management System," and naming Muralidhara Varmaraja, Meng Feng, Hang Lu, Ashish Singhal, Eugene Chikovani, Mark D. Lewis, Ying Wang, Re Lai, Robert A. M. Seaman, II, Jonathan Fan, and Yi Chang as inventors. The above-referenced application is hereby incorporated by reference herein in its entirety as if completely and fully set forth herein.

FIELD OF THE INVENTION

This invention relates to order management systems and, more particularly, to providing order management functionality as a service.

BACKGROUND

Order management systems provide a framework for providing functionality such as that needed to define a sales context, manage products and catalogs, generate pricing information, and analyze customer behavior. However, such order management functionality is typically integrated with the interface for accessing that functionality. Accordingly, the order management functionality is typically only accessible via static, pre-specified interfaces. For example, many order management systems provide a single interface that provides limited, if any, customizability, which may in turn limit a client's ability to control the look and feel of the user interface that client presents to customers.

Furthermore, the standard interfaces may not be available for use with certain sales channels, effectively rendering the underlying order management system functionality inaccessible to those sales channels. This can in turn require that the underlying order management system functionality be duplicated for each sales channel. In such a system, each instance of the underlying functionality must be updated whenever a change (e.g., to the products within a product line or to product pricing) is made. Since multiple different systems must be updated in order to propagate each change, there is an increased likelihood that there will be inconsistencies among the sales channels (e.g., due to the change not be entered at the same time or in the same manner in each system).

BRIEF DESCRIPTION OF THE DRAWINGS

A more complete understanding of the present invention may be acquired by referring to the following description and the accompanying drawings, in which like reference numbers indicate like features.

Figure 1:
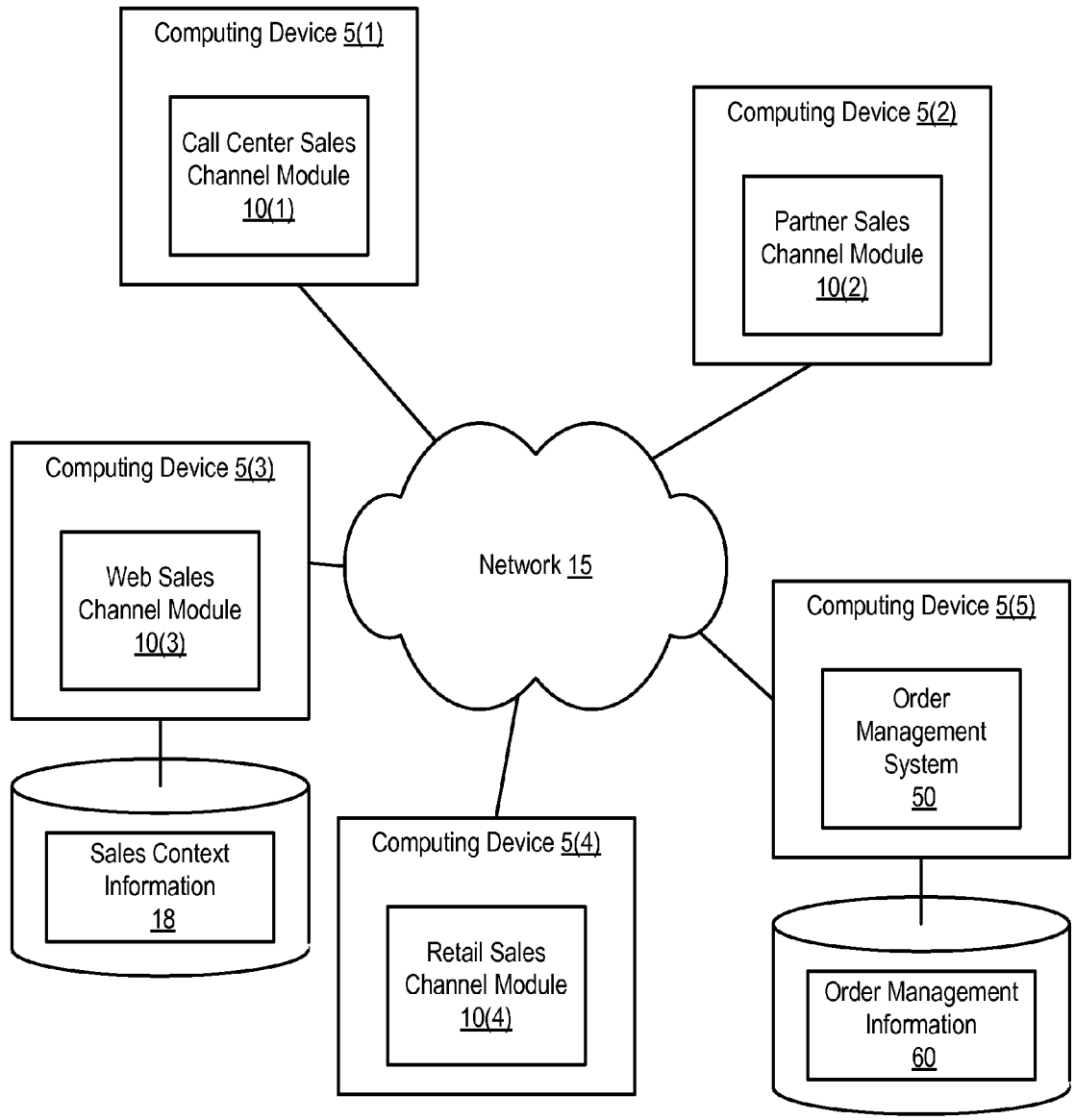
FIG. 1 is a block diagram of a system that includes an order management system that provides order management functionality as a Web Service, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a system that includes an order management system that provides various order management functions as Web Services. As shown, the system includes several computing devices 5(1), 5(2), 5(3), 5(4), and 5(5). Each computing device can include one or more servers, personal computers, cell phones, laptop computers, personal digital assistants, or other computing devices that are capable of implementing a sales channel module or order management system in hardware and/or software.

Computing device 5(5) implements an order management system 50. Order management system 50 provides functionality that can be used to, for example, define a sales context, manage product and/or catalog information, proving pricing information, and/or analyze customer behavior. Order management system 50 can also provide functionality to capture orders, orchestrate orders, and/or fulfill customer orders. While FIG. 1 shows order management system 50 being implemented on a single computing device 5(5), it is noted that in many implementations, the functionality of order management system 50 may be distributed among several such computing devices.

Order management system 50 can provide access to, generate, and/or maintain order management information 60. Order management information 60 can include pricing information, rules information (e.g., for use in determining pricing, product configurations, product eligibility, and the like), catalog and product information, and other appropriate information.

Computing devices 5(1), 5(2), 5(3), and 5(4) each implement a respective sales channel module. These sales channel modules are used to facilitate respective sales channels. In particular, call center sales channel module 10(1), which is implemented on computing device 5(1), is used to facilitate a call center sales channel. In one embodiment, call center sales channel module 10(1) provides a user interface to a customer service agent working in a call center, allowing the customer service agent to use functionality provided by order management system 50.

Similarly, computing device 5(2) implements a partner sales channel module 10(2). Partner sales channel module 10(2) can facilitate sales (via order management system 50) of one client's products and/or services by another client, which is referred to as a partner.

Computing device 5(3) implements a Web sales channel module 10(3). Web sales channel module 10(3) facilitates orders over the Internet. For example, Web sales channel module 10(3) can include a Web server that allows users to browse Web pages. Web sales channel module 10(3) can interact with order management system 50 in order to obtain information to display in the Web pages being supplied to users.

Computing device 5(4) implements a retail sales channel module 10(4). Retail sales channel module 10(4) can operate in a retail environment. Retail sales channel module 10(4) can provide sales clerks and/or customers with access to the functionality provided by order management system 50 in order to facilitate sales and ordering in the retail environment.

Computing devices 5(1)-5(5) are coupled by a network 15. Network 15 can include one or more Local Area Networks (LANs) and/or Wide Area Networks (WANs) such as the Internet. Network 15 can be implemented using various wireless links, coaxial cables, fiber optic cables, and the like. It is noted that in alternative embodiments, instead of being implemented on separate computing devices from each other and from order management system 50, one or more sales channel modules can be implemented on the same computing device as each other or on the same computing device as all or part of order management system 50.

Each sales channel module 10(1), 10(2), 10(3), and 10(4) can thus interact with order management system 50 in order to facilitate sales and orders via a particular sales channel. Sales channel modules 10(1), 10(2), 10(3), and 10(4) can be implemented in a variety of different ways, using various different types of applications. For example, call center sales channel module 10(1) can be a mainframe order entry system, while partner sales channel module 10(2) can be implemented using an application such as Seibel™ Business Applications software, available from Oracle Corporation of Redwood Shores, Calif., or Microsoft™ Sharepoint Server, available from Microsoft Corporation of Redmond, Wash. In general, each sales channel module may be implemented differently than each other sales channel module.

Each sales channel module can also maintain sales context information, such as sales context information 18 maintained by Web sales channel module 10(3). Such sales context information can include shopping cart information (e.g., for a Web sales channel), customer identifiers or other information (e.g., such as a prior order history) associated with a customer, and the like.

As briefly noted above, order management system 50 provides order management functionality as a Web Service. A Web Service is a discrete piece of business logic that is accessible via Internet protocols. Such a Web Service can be specified using Web Services Description Language (WSDL). In particular, WSDL is a format, based in eXtensible Markup Language (XML), for defining a Web Service interface. WSDL can be used to specify the endpoints, location, protocol binding, operations, parameters, and/or data types associated with a Web Service.

The organization that creates order management system 50 can generate a WSDL document (e.g., an XML document complying with WSDL) that describes the Web Service(s) provided by order management system 50. For each Web Service, the WSDL document can describe the operations provided by the Web Service, the input and output message structures for each operation, and the mechanism used to contact the Web Service.

Web Services are accessed using an XML-based transport protocol such as Service Oriented Architecture Protocol (SOAP). In particular, Web Service signatures (which are messages that comply with a particular Web Service's WSDL file) can be transported via SOAP.

Using Web Services to access order management functionality allows the order management functionality to be decoupled from the sales channel module accessing the order management functionality. Accordingly, each different sales channel module can be implemented differently (and independently), so long as the resulting sales channel modules are able to request Web Services. Accordingly, a given sales channel module can be implemented whatever technology best suits the needs of a particular sales channel. Furthermore, the technology used to implement a particular sales channel module can be modified without necessitating modifications to the underlying order management system. Similarly, the particular software modules used to implement the order management system's functionality can be modified without necessitating changes in the sales channel modules that access that functionality.

Furthermore, each sales channel module 10(1)-10(4) can access the same order management functionality by accessing the order management functionality as a Web Service. Accordingly, the same underlying business logic, workflows, and order management information can be used to support multiple sales channels. This allows a consistent user experience (in terms of available products, pricing, discounting, and the like) to be provided across multiple different sales channels. Furthermore, whenever changes need to be made (e.g., to reflect new products, new pricing, and the like), the changes can be made just once to the underlying order management system 50. The updated order management system 50 will then return the updated service or information to each of the different sales channels.

Figure 2:
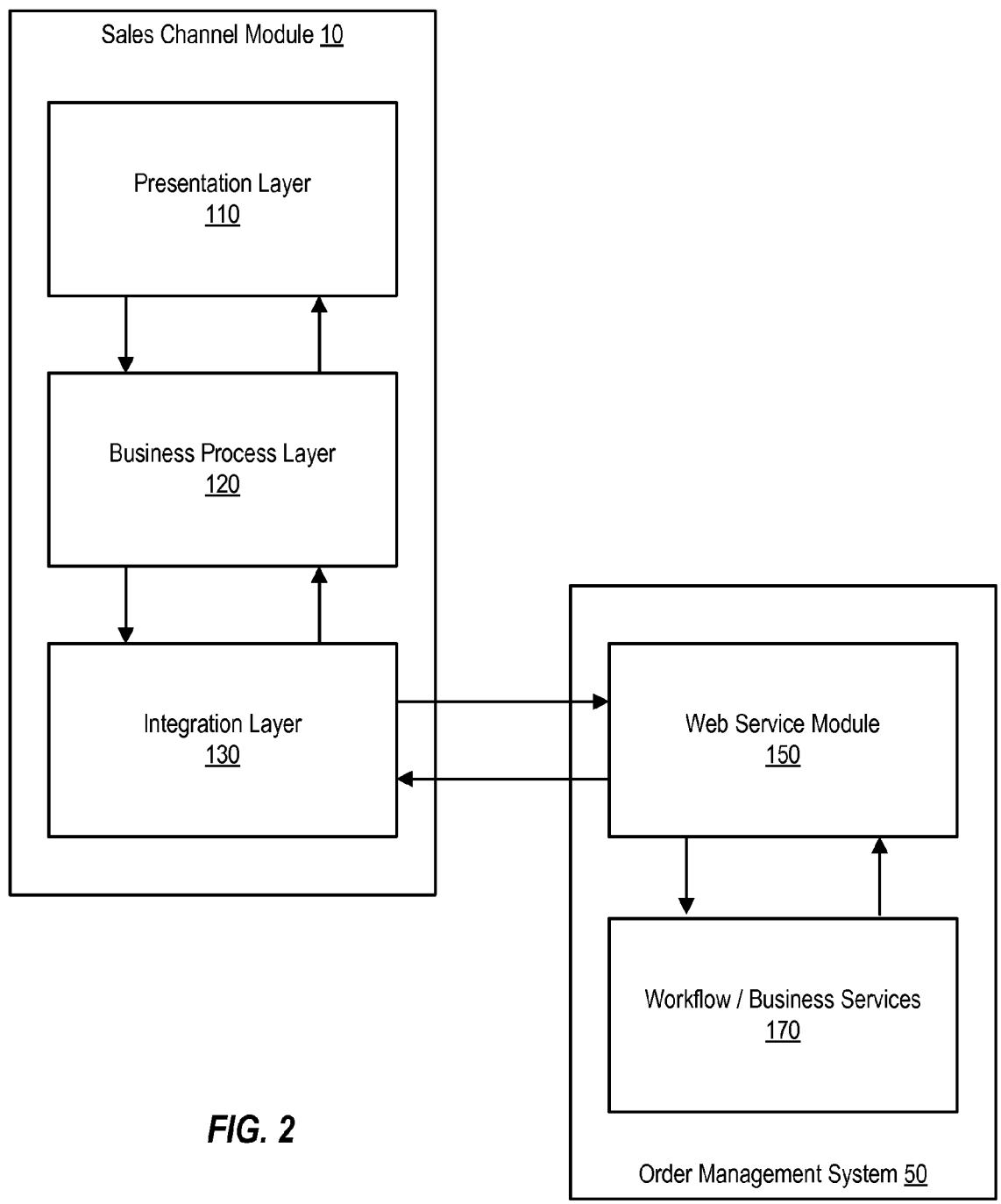
FIG. 2 is a block diagram of the Web Services interface between a sales channel module and an order management system, according to one embodiment of the present invention.

FIG. 2 is a block diagram of the Web Services interface between a sales channel module and an order management system. In this example, a sales channel module 10 (e.g., one of sales channel modules 10(1)-10(4) of FIG. 1) is coupled to communicate with an order management system 50. In one embodiment, sales channel module 10 is implemented in a container or application server (e.g., a Java 2 Platform, Enterprise Edition (J2EE)™ container), and order management system 50 can be implemented in a different container or application server.

Sales channel module 10 includes a presentation layer 110 (e.g., used to provide a user interface), a business process layer 120 (e.g., used to implement workflows or business services), and an integration layer 130. Integration layer 130 includes a Web Service requester agent that is configured to request Web Services provided by order management system 50 by sending Web Service signatures via SOAP (or any other appropriate protocol).

Order management system 50 includes a Web Service module 150, which includes a Web service provider agent that is configured to receive Web Service signatures sent by sales channel module 10 and to send responsive Web Service signatures back to sales channel module 10. Web Service module 150 can also transform Web Service signatures into property sets that can be processed by workflow and/or business services 170. Similarly, Web Service module 150 can transform property sets generated by workflow and/or business services 170 into Web Service signatures and then send those Web Service signatures to the appropriate sales channel module.

Workflow and/or business services 170 include various modules for providing workflows and business services. For example, such modules can include a module that provides a pricing workflow, a module that provides product configuration functionality, a module that provides access to catalog and product information, and the like. Workflow and/or business services 170 can operate on property sets provided by Web Service module 150, modify and/or access order management information (e.g., order management information 60 of FIG. 1), and return results (again in the form of property sets) to Web Service module 150.

Figure 3:
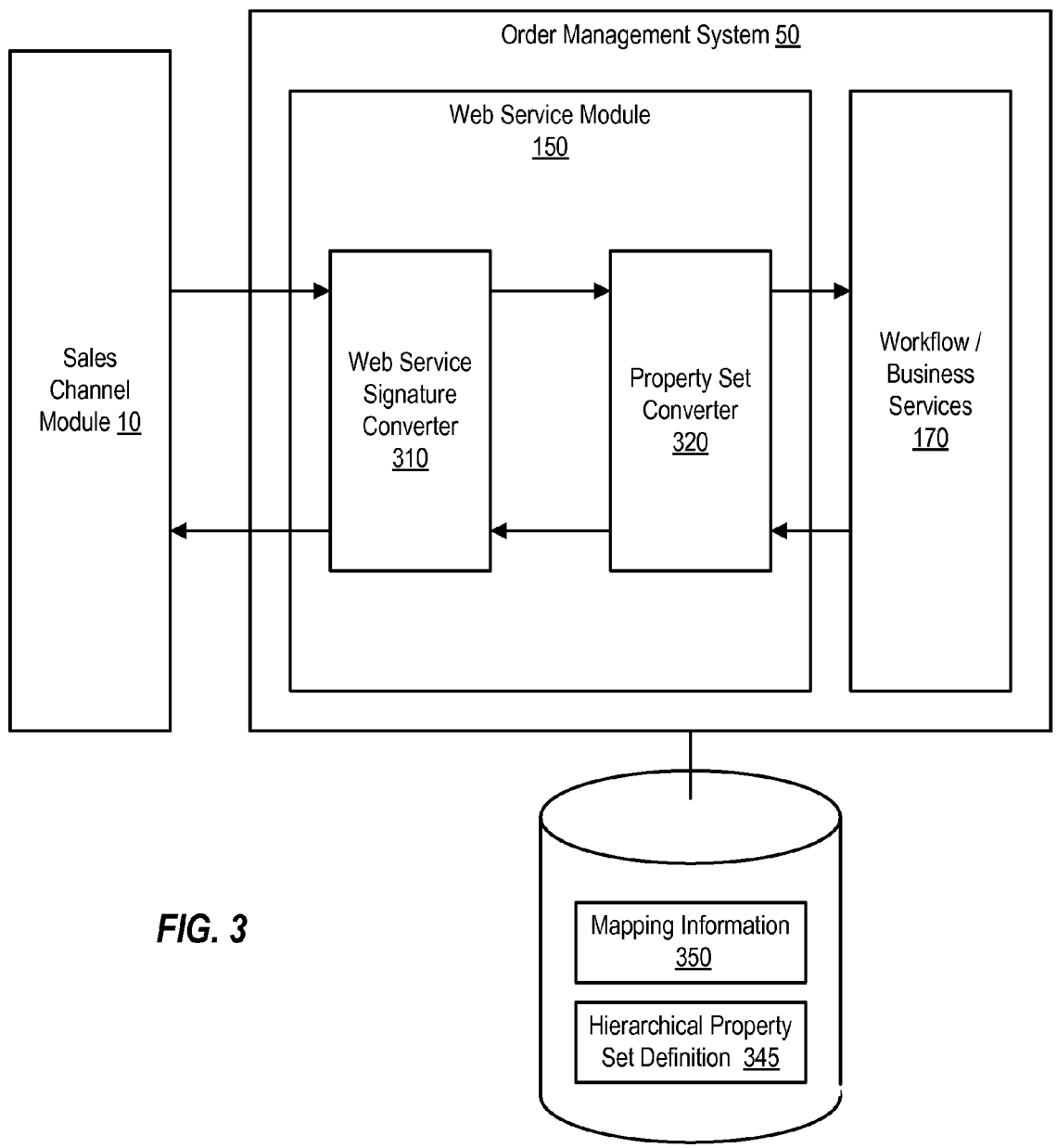
FIG. 3 is a block diagram of an order management system that translates a Web Services signature into a format that can be processed by a workflow and/or business service within the order management system, according to one embodiment of the present invention.

FIG. 3 is a block diagram of an order management system that translates a Web Services signature into a format that can be processed by workflows and/or business components with the order management system. As shown, order management system 50 communicates with a sales channel module 10 (e.g., one of sales channel modules 10(1)-10(4) of FIG. 1) via a Web Services interface. Order management system 50 includes a Web Service module 150 (e.g., like Web Service module 150 of FIG. 2) and workflow and/or business services 170. Web Services module 150 includes a Web Service signature converter 310 and a property set converter 320.

Web Service module 150 is configured to detect a Web Service signature sent to order management system 50 by sales channel module 10 via an appropriate protocol (e.g., SOAP). A Web Service signature specifies the particular service (e.g., within workflow and/or business services 170) that the sales channel module wants to invoke, as well as any other information (e.g., sales context information, such as that representing a customer ID, shopping cart, or the like) needed by the specified service. A Web Service signature can be implemented as an XML object.

In one embodiment, the XML object used to implement a Web Service signature can include all possible fields for all possible services within order management system 50 that are available as Web Services. Thus, a single Web Service signature can include fields corresponding to requests for pricing information, requests for configuration options, requests for catalog information, and the like. In such an embodiment, only those fields needed by the specified service need to be populated by the requesting sales channel module 10. A WSDL document can specify the particular fields within the XML object that should be populated when requesting a particular service.

In response to Web Service module 150 detecting a Web Service signature, Web Service signature converter 310 transforms the Web Service signature into a property set. Property sets are data objects that can be consumed by a workflow or business service. Property sets are collections of properties. Each property can include a typed name-value pair, where the name identifies the particular property, the value is the value of the property, and the type identifies the type of values that the property can take (e.g., text, ID, number, date/time, and the like). Property set elements may have one or more child property set elements assigned to them to form a hierarchical property set.

Property sets allow data objects to be maintained independently of the applications that generate and consume those data objects. Accordingly, the use of property sets allows the data objects to be decoupled from the workflow or business service that operates on the data objects. By virtue of this decoupling, a change in how a particular workflow is implemented will not necessitate a change in how the data object is structured.

In this illustrated example, Web Service signature converter 310 transforms the Web Service signature into a hierarchical property set. A hierarchical property set can organize data in a hierarchical fashion. For example, a complex product can include several different components, each of which may include one or more sub-components. This complex product can be represented in a hierarchy, with the product itself at the top level of the hierarchy (e.g., in a first property set element) and the product's components in a second level of the hierarchy (e.g., in one or more second property set elements that are children of the first property set element). The sub-components can then be arranged in a third level, beneath the appropriate components in the second level. Bundled products can also be represented in a hierarchical manner, such that the bundle is the top level of the hierarchy and each product within the bundle is represented at the next level of the hierarchy.

Web Service signature converter 310 transforms the Web Service signature into a hierarchical property set based upon a hierarchical property set definition 345. In one embodiment, multiple hierarchical property set definitions are available (e.g., one for each type of Web Service signature that can be provided to Web Service module 150). Web Service signature converter 310 can select the appropriate hierarchical property set definition based upon the type of Web Service signature to be converted (e.g., as determined based upon the value of one or more fields of the received Web Service signature). Alternatively, a single hierarchical property set definition may be used, where the single definition includes all properties that are needed for all of the available services.

Hierarchical property set definition 345 specifies the particular organization and content of the property set elements making up the hierarchical property set. For example, hierarchical property set definition 345 can specify that the hierarchical property set includes two types of hierarchical property set elements: a context element and one or more row sets. The context element stores information corresponding to the header of a quote and can include sales context information. Each row set corresponds to a line item of a quote and can include hierarchical arrangements of attributes that represent, for example, a product configuration. It is noted that certain types of Web Service signatures may only include context information, and thus the resulting hierarchical property set generated from such signatures may not include a row set.

Hierarchical property set definition 345 can also specify what types of information (included in the Web Service signature) should be included in each type of hierarchical property set. For a given Web Service signature, Web Service signature converter 310 can use hierarchical property set definition to identify 345 whether both types of hierarchical property set information need to be generated, as well as to populate the resulting hierarchical property set with the information in the Web Service signature. Thus, the hierarchical property set definition 345 can correlate each property to one or more fields of a Web Service signature.

In one embodiment, the Web Service signature structure is very similar to the hierarchical property set structure (e.g., the WSDL document used to define the structure of the Web Service signature can be based upon the hierarchical property set structure), such that each field within the Web Service signature can correspond to a property within the hierarchical property set. It is noted that there need not necessarily be a one-to-one mapping, however. Instead, multiple different Web Service signature fields can map to the same property within the hierarchical property set.

Some services and/or workflows may not be able to process hierarchical property sets. Accordingly, if such services are being invoked by the Web Service signature, property set converter 320 can convert the hierarchical property set into a flat (i.e., non-hierarchical) property set. For example, a particular service may not be able to handle hierarchical representations of complex products that include multiple components or of bundled products in which multiple simple or hierarchical representations of complex products are bundled together. Accordingly, such hierarchical representations can be converted into non-hierarchical representations.

Property set converter 320 performs this conversion by accessing mapping information 350. Mapping information 350 contains, for each property in the flat property set, a mapping declaration that identifies both a path to a property in the hierarchical property set and the name of a variable in the flat property set. The mapping information can also specify the type of value the property can take, whether the property is an input, output, or input and output property, and the default value of the property (e.g., if there is no value of a particular property of the hierarchical property set, property set converter 320 can include the default value in the corresponding property of the flat property set).

An example of a simple set of mapping declarations that can be used in one embodiment is:

| Variable name | Path | I/O |
| --- | --- | --- |
| Currency Code | $External/Header/Currency Code | In |
| Product Name | $External/Line Item/Product Name | In/Out |
| Id | $External/Line Item/Id | In/Out |

These mapping declarations show that value of the "Currency code" variable of the flat property set can be obtained from the property located at "Header/Currency Code" in the hierarchical property set, and that this property is an input ("In") only property (i.e., this property will only be included in property sets being input to workflow and/or business services 170). Similarly, the value of the "Product Name" variable of the flat property set can be obtained from the property located at "Line Item/Product Name" in the hierarchical property set, and this property is an input and output ("In/Out") property that will be included in property sets input to and output from workflow and/or business services 170. Output only properties (not shown in the above example) are only included in property sets being output by workflow and/or business services 170. The "$External" portion of the path can indicate that the value of the hierarchical property identified by that path is generated externally to the order management system.

In addition to converting the hierarchical property set to a flat property set, property set converter 320 can also convert property names in the hierarchical property set to variable names, if those names are different. Additionally, property set converter 320 can add a "wrapper" layer to the flat property set. The wrapper layer can include metadata such as information used to map transactional data to a common namespace. In one embodiment, the wrapper layer in the flat property set can indicate the child relationships that existed between properties in the hierarchical property set.

After the Web Service signature has been transformed into an appropriate hierarchical or flat property set, the resulting property set can be processed by the workflow or business service (in workflow and/or business services 170) invoked in the Web Service signature. After performing the invoked workflow and/or business service, workflow and/or business services 170 returns a resulting property set to Web Service module 150. For example, a pricing workflow can produce a property set that includes various pricing information. It is noted that the resulting property set can include different values (e.g., because different properties are populated or because the values of certain properties have been modified) than those that were in the original property set input to workflow and/or business services 170. Web Service module 150 can then transform this property set into a Web Service signature that can be sent to sales channel module 10.

If the resulting property set generated by workflow and/or business services 170 is already in a hierarchical format (or if no potentially hierarchical elements are present within the resulting property set), the result can simply be transformed by Web Service signature converter 310. Web Service signature converter 310 can use the same hierarchical property set definition 345 used to transform Web Service signature into a hierarchical property set to transform the resulting hierarchical property set back into a Web Service signature.

If the resulting property set includes elements that can be (but are not currently) represented hierarchically (e.g., as determined by looking up the included elements in the mapping information), the resulting property set can be provided to property set converter 320, which again uses the same mapping information 350 to translate the flat resulting property set into a hierarchical resulting property set. Here, property set converter 320 can take the value of a variable in the flat property set and populate that value in the corresponding property of the hierarchical property set. Property set converter 320 can include only the properties identified as being output or dual input and output properties in the resulting hierarchical property set, if the mapping declaration includes such information (in other words, properties that are just input properties can be omitted from the resulting hierarchical property set). For a given variable in the flat property set, the corresponding property of the hierarchical property set is identified by the path in the mapping declaration of mapping information 350 corresponding to the given variable of the flat property set. Accordingly, the same mapping declarations can be used to translate hierarchical property sets into flat property sets and vice versa. Once the hierarchical property has been generated by property set converter 320, Web Service signature converter 310 can transform the hierarchical property set into a Web Service signature.

It is noted that the translation services provided by Web Service module 150 effectively allow sales channel module 10 to invoke a Web Service that takes an XML file (e.g., the Web Service signature) as input, processes that XML file according to desired workflow and/or business services, and returns a resulting XML file, since the underlying transformations are not apparent to sales channel module 10. Furthermore, this allows many different sales channels to invoke the same underlying workflow and/or business services module 170 using Web Service signatures, without having to duplicate those workflows and/or business services for each sales channel that needs access.

In the example of FIG. 3, up to two different transformations can be performed on incoming Web Service signatures or outgoing property sets. In alternative embodiments, fewer or additional transformations can be performed. For example, in another embodiment, a single transformation can be used to convert a Web Service signature into a flat property set, which can then be processed by workflow and/or business services 170. In yet another embodiment, all of the underlying workflows and/or business services may be able to operate on hierarchical property sets, and thus there may not be a need for the functionality provided by property set converter 320. Thus, many variations of the system shown in FIG. 3 are possible and contemplated.

Figure 4A:
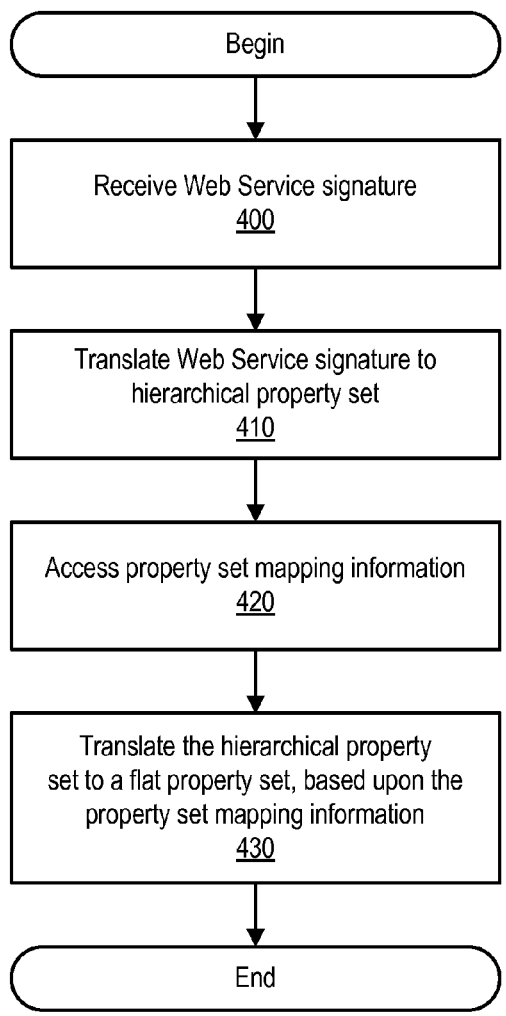
FIG. 4A is a flowchart of a method of translating a Web Services signature into a format that can be processed by a workflow and/or business service within the order management system, according to one embodiment of the present invention.

FIG. 4A is a flowchart of a method of translating a Web Services signature into a format that can be processed by a workflow and/or business components with the order management system. The method begins at 400, when a Web Service signature is received. This Web Services signature can include various information that will be processed and/or consumed by the service being invoked. At 410, the Web Service signature is transformed into a hierarchical property set. This transformation can be based upon a hierarchical property set definition that specifies the structure of the hierarchical property set.

Transforming the Web Service signature into the hierarchical property set can involve parsing the Web Service signature (e.g., as specified in XML) and extracting all of the populated values within that Web Service signature. The hierarchical property set definition can identify the property within the hierarchical property set that should store each extracted value. Accordingly, each value extracted from the Web Service signature can be stored into the appropriate property of the hierarchical property set. The hierarchical property set definition can also indicate the level of the hierarchy that includes that property (e.g., by specifying the parent property, if any, of that property).

If the hierarchical property set needs to be transformed into a flat (non-hierarchical) property set, property set mapping information can then be accessed, as shown at 420. This property set mapping information includes one or more property set declarations. These declarations associate the name of a property in a flat property set with a path that identifies a property in the hierarchical property set.

The property set matching information is then used to translate the hierarchical property set to a flat property set, as shown at 430. This process can involve navigating through the hierarchical property set in order to access each populated property within the hierarchical property set, accessing mapping information associated with each such property, and then storing the value of that property into a corresponding property, identified by the mapping information, of the flat property set. In some embodiments, this process is performed by recursively processing each property within the hierarchical property set. In one embodiment, properties at a grandchild level in the hierarchical property set can be moved to the child level as part of the conversion process. The resulting flat property set can then be processed by the service being invoked.

Figure 4B:
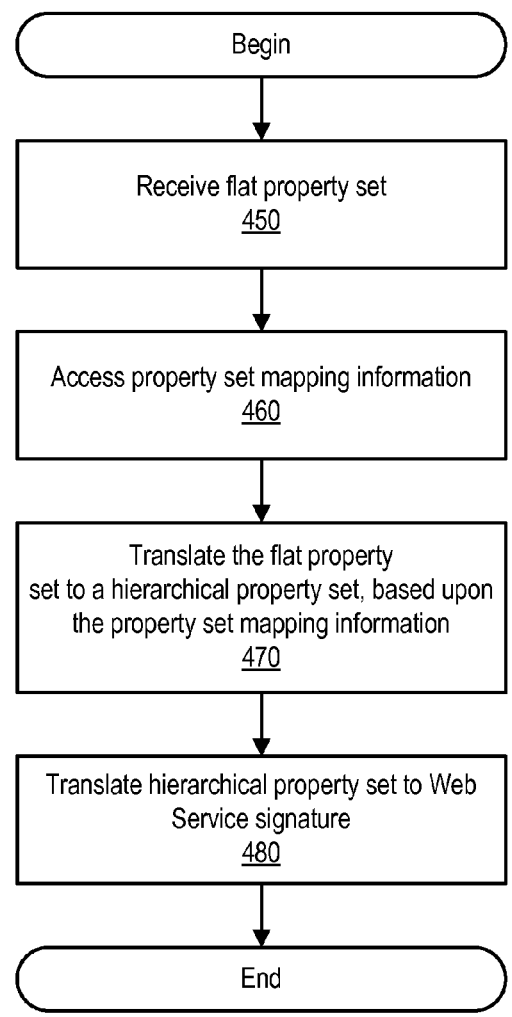
FIG. 4B is a flowchart of a method of translating information from a format generated by a workflow and/or business services within the order management system into a Web Services signature, according to one embodiment of the present invention.

FIG. 4B is a flowchart of a method of translating information from a format generated by a workflow and/or business components with the order management system into a Web Services signature. FIG. 4B illustrates how the same property set mapping information used in FIG. 4A can be used to translate a flat property set into a hierarchical property set.

The method of FIG. 4B begins at 450, when a flat property set is received from the service invoked by the Web Service signature received in operation 400 of FIG. 4A. As noted above, this flat property set can include different properties and/or values than the flat property set that was input to the service.

The property set mapping information is accessed, as shown at 460, and used to transform the flat property set to a hierarchical property set, as shown at 470. The hierarchical property set can then be transformed into a Web Service signature, as shown at 480, that can be returned to the application that originally invoked the service.

It is noted that each transformation indicated in FIGS. 4A and 4B can involve obtaining a value from one field or property of a source Web Service signature or property set, optionally formatting that value (e.g., to comply with a structural requirement of a destination Web Service signature or property set), and using that value to populate a field or property in a destination Web Service signature or property set. In addition to copying values, field or property names can also be copied. It is noted that in some situations, the field or property names can be modified (e.g., to comply with a structural requirement of a destination Web Service signature or property set) as part of the transformation process.

Figure 5:
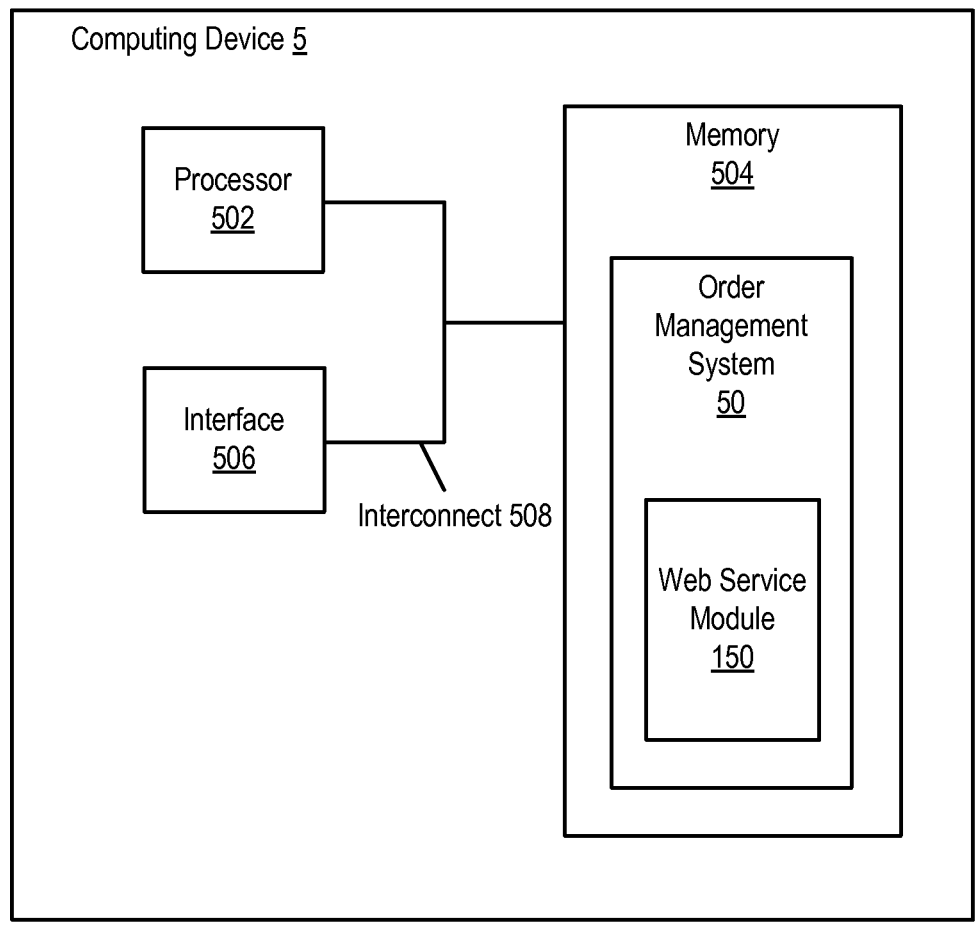
FIG. 5 is a block diagram of a computing device that illustrates how an order management system that provides a Web Services interface can be implemented in software, according to one embodiment of the present invention.

FIG. 5 is a block diagram of a computing device that illustrates how an order management system that provides a Web Services interface can be implemented in software. FIG. 5 is a block diagram of a computing device 5 (e.g., one of computing devices 5(1)-5(5) of FIG. 1) that implements all or part of an order management system 50. In particular, computing device 5 implements a Web Service module 150 (e.g., like that shown in FIGS. 2 and 3). While the illustrated example shows a single module executing on a single computing device, it is noted that in alternative embodiments, the functionality included within order management system 50 can be subdivided among multiple modules, each of which may be implemented on a separate computing device.

Computing device 5 can be a personal computer, network appliance, server, personal digital assistant, mobile phone, storage controller (e.g., an array controller, tape drive controller, or hard drive controller), or the like. As illustrated, computing device 5 includes one or more processors 502 (e.g., microprocessors, Programmable Logic Devices (PLDs), or Application Specific Integrated Circuits (ASICs)) configured to execute program instructions stored in memory 504. Memory 504 can include various types of RAM (Random Access Memory), Read Only Memory (ROM), Flash memory, Micro Electro-Mechanical Systems (MEMS) memory, magnetic core memory, and the like. Memory 504 can include both volatile and non-volatile memory. Computing device 5 also includes one or more interfaces 506. Processor 502, interface 506, and memory 504 are coupled to send and receive data and control signals by a bus or other interconnect.

Interface 506 can include a network interface to various networks and/or interfaces to various peripheral buses. For example, interface 506 can include a network interface via which order management system 50 sends and receives Web Service signatures. Interface 506 can also include an interface to one or more storage devices. For example, Web Service module 150 within order management system 50 can access a hierarchical property set definition and/or mapping information (e.g., mapping a hierarchical property set to a flat property set) stored on such a storage device.

In this example, program instructions and data executable to implement all or part of Web Service module 150 of order management system 50 are stored in a computer readable storage media such as memory 504. In some embodiments, such software is stored on a computer readable storage medium such as a Compact Disc (CD), Digital Versatile Disc (DVD), hard disk, optical disk, tape device, floppy disk, and the like). In order to be executed by processor 502, the instructions and data can be loaded into memory 504 from the other computer readable storage medium. The instructions and/or data can also be transferred to computing device 5 for storage in memory 504 via a network such as the Internet or upon a carrier medium.

The flowcharts provided herein are provided as examples, and it is noted that other embodiments can include different operations instead of and/or in addition to those shown in the flowcharts presented herein. Furthermore, in alternative embodiments, the operations shown in the flowcharts can be performed in a different order than shown. For example, in some embodiments, operations shown as being performed in series can be performed in parallel. Similarly, several Web Service signatures and/or property sets can be translated at substantially the same time (e.g., several instances of Web Service module 150 can be instantiated at the same time, and each instance can perform translations for Web Service signatures communicated as part of a respective session).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a first message, wherein
a structure of the first message is defined by a service description document;
transforming the first message into a first hierarchical property set, wherein
the first hierarchical property set comprises a plurality of properties being input to an order management system;
determining whether a workflow of the order management system is configured to process hierarchical property sets; and
in response to the determining making a determination that the workflow is not configured to process the hierarchical property sets,
accessing mapping information, wherein the mapping information associates a variable in a flat property set with a hierarchical property set path,
converting, using a processor, the first hierarchical property set to a first flat property set, based upon the mapping information, and
causing the order management system to process the first flat property set.

2. The method of claim 1, further comprising:
generating the first hierarchical property set in response to the receiving the first message, wherein the first hierarchical property set represents information comprised in the first message.

3. The method of claim 2, wherein the generating the first hierarchical property set further comprises:
storing one or more values comprised in a field of the first message in a property of the first hierarchical property set.

4. The method of claim 2, wherein the generating the first hierarchical property set further comprises:
determining whether the first hierarchical property set comprises both a context element and a row set element.

5. The method of claim 1, further comprising:
receiving a second flat property set;
accessing the mapping information; and
converting the second flat property set to a second hierarchical property set, based upon the mapping information.

6. The method of claim 5, further comprising:
converting the second hierarchical property set to a second message.

7. The method of claim 1, wherein the converting the first hierarchical property set to the first flat property set further comprises:
renaming one or more properties of the first hierarchical property set.

8. The method of claim 1, further comprising:
in response to the determining making a determination that the workflow is configured to process the hierarchical property sets,
communicating the first hierarchical property set to the workflow.

9. A method comprising:
receiving a first message, wherein
a structure of the first message is defined by a service description document;
transforming the first message into a first flat property set;
determining whether a workflow is configured to process hierarchical property sets; and
in response to the determining making a determination that the workflow is configured to process the hierarchical property sets,
converting the first flat property set to a first hierarchical property set, based upon mapping information, wherein the mapping information associates a variable in a flat property set with a hierarchical property set path, and
converting, using a processor, a second hierarchical property set to a second flat property set, based upon the mapping information, wherein the first flat property set is not the same as the second flat property set.

10. The method of claim 9, wherein the first flat property set is generated by an order management system, and wherein the second flat property set is consumed by the order management system.

11. The method of claim 9, further comprising:
converting the first hierarchical property set to the first message; and
converting a second message into the second hierarchical property set.

12. The method of claim 9, wherein the converting the first flat property set to the first hierarchical property set comprises:
determining whether the variable in the flat property set is an output variable, an input variable, or a dual input-output variable; and
including a value of the variable into the first hierarchical property set only if the variable is one of: an output variable or a dual input-output variable.

13. A non-transitory computer readable storage medium storing program instructions executable to:
receive a first message, wherein
a structure of the first message is defined by a service description document;
transform the first message into a first hierarchical property set, wherein
the first hierarchical property set comprises a plurality of properties being input to an order management system;
determine whether a workflow of the order management system is configured to process hierarchical property sets; and
in response to a determination that the workflow is not configured to process the hierarchical property sets,
access mapping information, wherein the mapping information associates a variable in a flat property set with a hierarchical property set path,
convert the first hierarchical property set to a first flat property set, based upon the mapping information, and
cause the order management system to process the first flat property set.

14. The non-transitory computer readable storage medium of claim 13, wherein the program instructions are further executable to:

generate the first hierarchical property set in response to receiving the first message, wherein the first hierarchical property set represents information comprised in the first message.

15. The non-transitory computer readable storage medium of claim 14, wherein the program instructions executable to generate the first hierarchical property set comprise program instructions configured to:
store one or more values comprised in a field of the first message in a property of the first hierarchical property set.

16. The non-transitory computer readable storage medium of claim 14, wherein the program instructions executable to generate the first hierarchical property set comprise program instructions configured to:
determine whether the first hierarchical property set comprises both a context element and a row set element.

17. The non-transitory computer readable storage medium of claim 13, wherein the program instructions are further executable to:
receive a second flat property set;
access the mapping information; and
convert the second flat property set to a second hierarchical property set, based upon the mapping information.

18. The non-transitory computer readable storage medium of claim 17, wherein the program instructions are further executable to:
convert the second hierarchical property set to a second message.

19. The non-transitory computer readable storage medium of claim 13, wherein converting the first hierarchical property set to the first flat property set further comprises renaming one or more properties of the first hierarchical property set.

20. A computing device comprising:
a processor; and
a memory, wherein the memory stores program instructions executable by the processor to implement a property set converter configured to
receive a first message, wherein
a structure of the first message is defined by a service description document,
transform the first message into a first hierarchical property set, wherein
the first hierarchical property set comprises a plurality of properties being input to an order management system,
determine whether a workflow of the order management system is configured to process hierarchical property sets, and
in response to a determination that the workflow is not configured to process the hierarchical property sets,
access mapping information, wherein the mapping information associates a variable in a flat property set with a hierarchical property set path,
convert the first hierarchical property set to a first flat property set, based upon the mapping information, and
cause the order management system to process the first flat property set.

21. The system of claim 20, wherein the property set converter is further configured to:
receive a second flat property set from the order management system;
access the mapping information;
convert the second flat property set to a second hierarchical property set, based upon the mapping information; and
cause one or more values in the second hierarchical property set to be output to a sales channel module.

22. A system comprising:
computer readable storage means for storing mapping information, wherein the mapping information associates a property of a flat property set with a hierarchical property set path;
a processor configured to determine whether a workflow is configured to process hierarchical property sets;
first property set converter means for converting, based at least in part on a determination that the workflow is configured to process the hierarchical property sets, a first flat property set to a first hierarchical property set, based upon the mapping information, wherein the mapping information associates a variable in a flat property set with a hierarchical property set path; and
second property set converter means for converting a second hierarchical property set to a second flat property set, based upon the mapping information, wherein the first flat property set is not the same as the second flat property set.

* * * * *